Jan. 7, 1930. W. A. McELROY 1,742,269
ARTIFICIAL HAND
Filed Dec. 19, 1927 2 Sheets-Sheet 1

INVENTOR
WILLIAM A. McELROY
BY
ATTORNEY

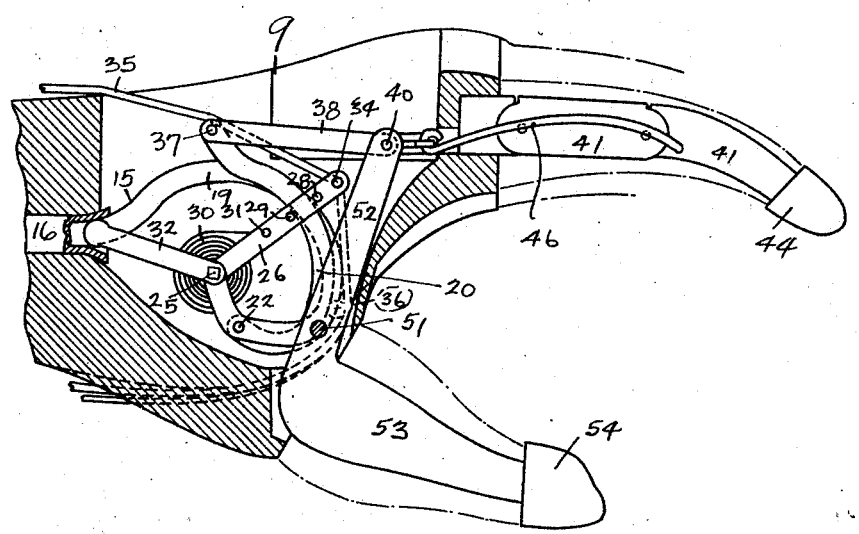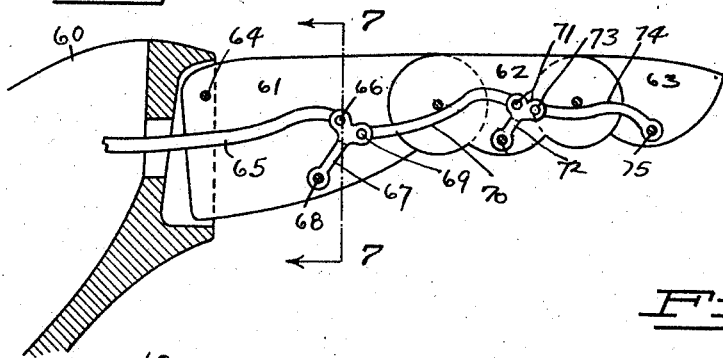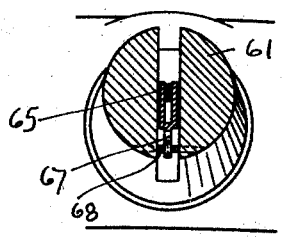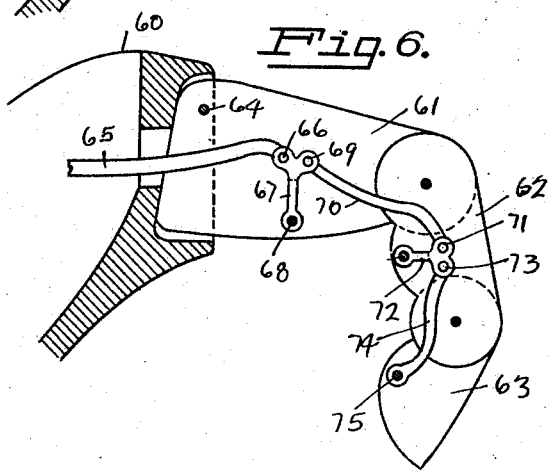

Patented Jan. 7, 1930

1,742,269

UNITED STATES PATENT OFFICE

WILLIAM A. McELROY, OF SAN FRANCISCO, CALIFORNIA

ARTIFICIAL HAND

Application filed December 19, 1927. Serial No. 241,214.

This invention relates to a device which may be used as a substitute for a missing human hand, and on which the thumb and fingers may be opened at will or closed upon an article to be held, with any desired degree of pressure, depending upon the demand of the work being done.

A further object of the invention is to provide an artificial hand on which the fingers and thumb are movably mounted and so constructed that the said fingers and thumb may be moved relative to each other or held in any desired open or closed position.

A still further object of the invention is to provide an artificial hand having a mechanism mounted therein to be actuated by movement of the body to separate or close a thumb and fingers movably mounted on said hand.

A still further object of the invention is to provide an artificial finger for an artificial hand, comprised of a series of articulated joints, having the same number of joints as the finger on a human hand, the said artificial finger having an operating means connected thereto, by which it may be made to assume every position that might be taken by a human finger.

Other objects of the invention are to provide an artificial hand having a thumb and movable fingers thereon, in combination with means for operating said thumb and fingers, that is superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings

Fig. 4 is a cross section similar to Fig. 2, showing the thumb and fingers and operating mechanism therefor, in the open or operative position.

Fig. 5 is a side elevation of a modified form of finger, and operating mechanism therefor, in the extended position.

Fig. 6 is a view of Fig. 5 showing the finger in a closed position.

Fig. 7 is a section taken through Fig. 5 on the line 7—7.

Figure 1:
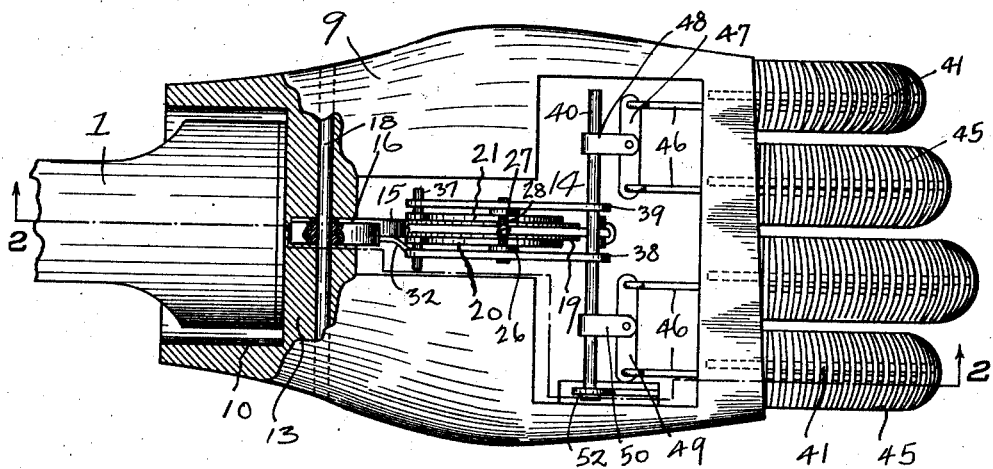
Fig. 1 represents a plan view of the upper side of an artificial hand, constructed in accordance with my invention, the said drawing illustrating the hand broken away to show the mechanism for operating and controlling movement of the fingers and thumb.

The present invention concerns an artificial hand which will function as an efficient mechanical substitute for a missing human hand, in doing various kinds of work, where the use of gripping power by the said artificial hand is desired. In the present invention, as in my U. S. Patent No. 1,417,267, dated May 23, 1922, I have provided movable elements on the artificial hand, which may be opened or closed at will, through body action of the wearer of the device, from or upon any article to be held, with any desired degree of pressure, depending upon the demand of the work being done. My artificial hand is preferably enclosed by a glove, to simulate the appearance of a natural hand and fingers, to not interfere with any opening or closing movement of the thumb and fingers.

In detail, the construction illustrated in the drawings comprises an arm or supporting member 1, to be demountably attached to the arm of the wearer in place of the missing arm or hand. The supporting member 1 is diagrammatically illustrated, so as to represent any general type or form of artificial arm, and which, in this particular instance, is composed of a substantially cylindrical body having a bushing 2 in the end thereof. A plate 3 is provided within the body 1 to abut against the inner end of the bushing 2. Tension springs 4 are mounted within the arm 1 between the closed end thereof and the movable plate 3, to normally press or force the plate 3 into contact with the inner end of the bushing 2. The inner end of the bushing 2 is provided with a plurality of slots or serrations 5 therearound. The interior of the bushing 2 is also provided with a slot or groove 6 that extends the entire length thereof. A shaft 7 (on an artificial hand to be hereinafter described) which is provided with a pin 8 projecting from the circumference thereof, is adapted to enter the slotted bushing 2 to permit the pin 8 on the said shaft 7 to be engaged with the serrations or grooves 5 on the inner end of the bushing 2. The tension plate 3 forces the pin 8 on the shaft 7 into engagement with the serrations 5 on the bushing and prevents a disengagement thereof, except by a force sufficient to overcome the tension of the springs. The detachable shaft and socket construction is one which may be used on any type of artificial arm, or hand, and the particular construction illustrated is not in any wise dependent upon the form of artificial hand and fingers to be hereinafter described.

An artificial hand 9 shaped or molded to conform substantially to the same curves and contours of a human hand, is provided with a hollowed out portion 10 adjacent the wrist end thereof. A plate 11 is screwed at 12 into the base or bottom 13 of the hollowed out portion, and the shaft 7 with a projecting pin 8 thereon is secured to said plate. The socket end of the arm 1 that is worn by the wearer is adapted to fit into the cavity 10 in the hand, to engage the aforementioned shaft 7 to hold the hand 9 and arm 1 in detachable engagement in the manner previously described.

The entire interior of the hand 9 is hollowed at 14 to receive a thumb and finger operating mechanism. The thumb and finger operating mechanism consists of a hook shaped member 15 having an end 16 thereof mounted in a socket 17 in the hand. A pin 18 extends through the end 16 of the hook member, to confine it in a relatively fixed position within the hand. The hook member 15 is provided with an eccentrically curved portion 19 thereon. The hook member 15 remains in a relatively stationary position within the hand and never moves from its fixed position.

A pair of curved plates 20 and 21 are mounted on opposite sides of the hook member 15. Each plate 20 and 21 is of a different curvature than the curvature 19 of the hook member. The curved portions 19 of the hook member and plates 20 and 21 are so curved that they will always be eccentric relative to each other, and at no time will the curve of the said two parts come into an exact registry. The lower end of plates 20 and 21 is pivotally connected by a pin 22 at 23 to the hook shaped member 15. Thus the curved portion 19 of the hook shaped member 15 and curved plates 20 and 21 are held in predetermined position relative to each other, to permit the curved plates 20 and 21 to be moved relative to the curved hook member 15. The lower end 24 of the curved plates 20 and 21 are connected together by a square headed shaft 25. The axis of this shaft 25 is located at the point which would be the approximate radius center for striking the curve 19 of the hook member 15. The location of the axis of the shaft 25 relative to the curve 19 of the hook 15 is not a fixed one, because said shaft is mounted on the ends of the curved plates 20 and 21, which, in the operation of the device to be hereinafter described, will have a slight movement to and from the hook 15 with each operation of the device.

A pair of bars 26 and 27 are mounted on the opposite outer sides of the curved plates 20 and 21 and said bars 26 and 27 have their lower ends fixed on the square headed shaft 25 that is mounted in the lower ends of the curved plates 20 and 21. The upper ends of the bars 26 and 27 project above and beyond the outer curved periphery 19 of the hook member 15. The bars 26 and 27 are connected together by a pair of pins 28 and 29, the pin 28 being arranged to contact with the outer curve 19 of the hook member 15, and the other pin 29 to contact with the inner curve of the hook member 15. The curved plates 20 and 21 are also confined between the pins 28 and 29 on the bars 26 and 27, so that any radial movement of the yoke bars 26 and 27 in the fixed orbit prescribed by the curves of the hook shaped member 15 will cause a corresponding radial movement of the curved plates 20 and 21. A clock spring 30 of the flat, spirally wound type is arranged around the square shaft 25, said spring having its inner end secured to the square headed shaft 25, and its outer end fixed or secured to a pin 31 that passes between the control bars 26 and 27. In order to keep the spring 30 wound, and under tension, I provide an arm 32 with a square socket therein to engage the square head of the shaft 25 and the free end of said arm is slidably mounted in a guideway 33 arranged adjacent the stem 16 of the hook shaped member 15.

The upper ends of the bars 26 and 27 are connected by a pin 34 to which a control cord 35 is fastened. The control cord 35 comes in over the upper part of the hand 9 and is secured to the pin 34 on the bars 26 and 27. The cord 35 then continues down around the outer periphery 19 of the hook shaped member 15, passes around a roller 36 that is mounted in the said hand 9, and passes outwardly and backwardly through the palm of the hand. The control cord 35 is secured to suitable suspenders or controlling apparatus (not shown) mounted around the body of the wearer of the hand. By pulling the control cord 35 in the direction of arrow "A" from the palm side of the hand, the bars 26 and 27 are caused to be swung around the hook member 15 from the position shown in Fig. 2 to the position shown in Fig. 4. This swinging movement of the bars 26 and 27 causes a corresponding swinging movement of the curved plates 20 and 21. The free ends of the curved plates 20 and 21 are provided with mechanism thereon for moving the thumb and fingers, to be hereinafter described, and hence movement of the free ends of said curved plates causes the thumb and fingers to be moved from the closed position shown in Fig. 2, to the open position shown in Fig. 4. The pulling of the control cord 35, to open the fingers as shown in Fig. 4, is against the tension of the spring 30. When the fingers are placed in the open position shown in Fig. 4, the spring 30 is wound, and immediately after the release of the pulling tension on the cord, the spring 30 moves the fingers from the open position shown in Fig. 4 back to the closed position shown in Fig. 2.

Figure 2:
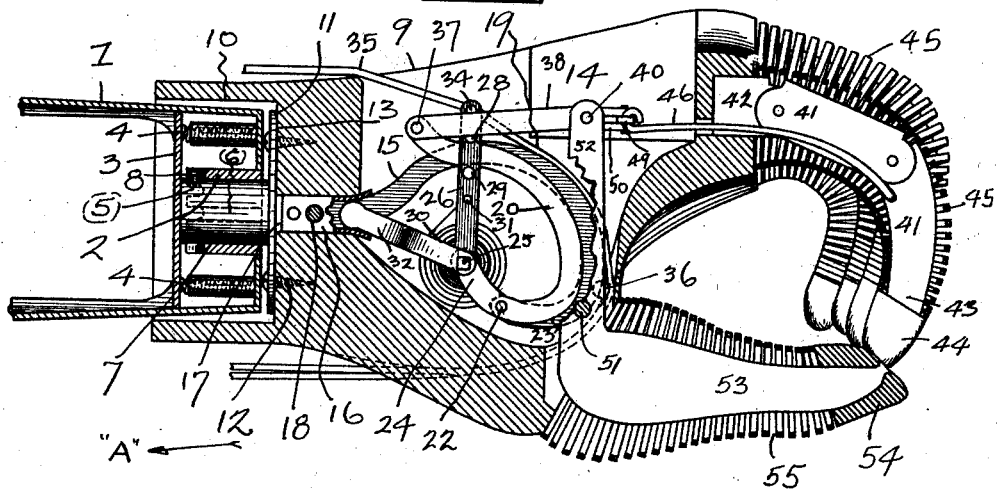
Fig. 2 is a cross section taken through Fig. 1 on the line 2—2, showing the hand in a closed position.
Figure 3:
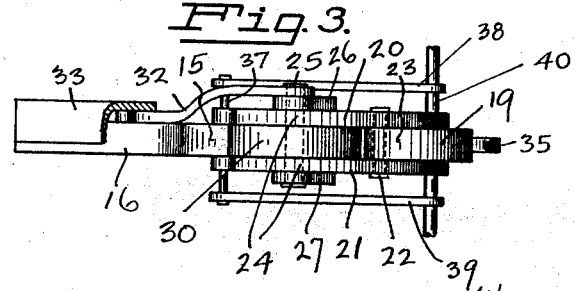
Fig. 3 is a plan view from the underside of the finger controlling mechanism.

It should be noticed that the swinging movement of the curved plates 20 and 21 moves the axis of the square headed shaft 25 from the position shown in Fig. 2 to the position shown in Fig. 4. This change of position of the axis of the square headed shaft 25 does not affect the tension of the spring 30 in view of the fact that the arm 32 for maintaining the spring under the proper tension, moves freely in the guideway 33 and hence adjusts itself to any position which may be assumed by the shaft 25.

A pin 37 is passed through the free ends of the curved plates 20 and 21 and a pair of rods 38 and 39 have common ends thereof secured to said pin 37. The opposite ends of said rods 38 and 39 have a shaft 40 mounted therein which passes laterally across the entire width of the back of the shaft. Each of the fingers on the hand consists of a plurality of plates 41 pivoted together to form an articulated member. One end 42 of each articulated member is securely anchored in the forward end of the hand 9 while each of the other ends 43 of the articulated members have a rubber or some other type of resilient tip 44 thereon. The articulated members that comprise each finger are enclosed in an enveloping wire caging 45 that gradually increases in diameter from the tip end 44 of each finger to the point where it meets the hand 9. The spring cagings 45 around each finger provide a light and resilient structure which will not prove burdensome to the wearer of the hand.

A wire 46 is connected to the forward or endmost joint of each of the articulated members comprising each finger, and the wire from each finger extends back into the hollowed out portion of the hand 9. The control wires 46 extending from the little finger and the adjoining finger are pivotally connected to an equalizer bar 47, which in turn is pivotally mounted on a supporting yoke 48 that is fixed on the cross shaft 40. Similarly, the control wires 46 from the index finger and the adjoining finger are pivotally connected to an equalizer bar 49 which is pivotally mounted on a yoke 50 fixed on the cross shaft 40. Each of the equalizer bars 47 and 49 are pivoted to the cross shaft 40 on opposite sides of the finger operating mechanism to provide a proper balance. The construction of the thumb moving mechanism is slightly different from the mechanism and construction of the fingers. The thumb construction consists of an angular or bell crank lever, pivoted to the hand at 51, the elbow of the bell crank. One end 52 of the bell crank lever is pivotally connected to the cross shaft 40, while the other arm 53 of the bell crank extends outwardly from the other side of the hand and constitutes the thumb structure. The extreme end of the projecting arm 53 forming the thumb is provided with a resilient tip 54 thereon and between said tip and the hand 9, the thumb arm is enclosed by a wire caging 55 arranged to conform to the outward contour of a thumb. Although I have shown and described wire cagings 45 and 55 around the thumb and fingers, in connection with this particular invention, I do not wish to be limited thereto, as it would be clearly within the purview of the invention to substitute some other type of finger encasing means.

In the actual operation of this invention, the wearer of the limb would have the control cord 35 secured to a suitable suspender apparatus that he would wear and the control cord would be tightened or drawn taut when desired to separate the thumb and fingers. Movement of the control cord 35 rotates the operating bars 26 and 27 and moves the curved plates 20 and 21 relative to the hook member 15. The pins 28 and 29 on the control bars 26 and 27 in their relation to the eccentrically positioned curved members 15 and 20 and 21, act as a cam, so that movement of the said control bars 26 and 27 relative to the eccentrically curved members, registers predetermined portions thereof and elevates or moves the curved members 20 and 21 according to the position of the operating bars 26 and 27. Movement of the control bars 26 and 27 away from the inoperative or closed position shown in Fig. 2, causes the curved plates 20 and 21, through that connection to move the cross shaft 40 toward the fingers on the hand. The forward movement of the cross shaft 40 likewise moves the equalizer bars 47 and 49, and control wires 46 leading to the fingers, forwardly and causes the fingers to be moved from the curved position shown in Fig. 2 to the straight position shown in Fig. 4. Likewise, the forward movement of the cross shaft 40 causes the bell crank lever comprising the thumb to swing downwardly into an open position away from the fingers. When the thumb and fingers are in the separated position shown in Fig. 4, sufficient space exists between the thumb and fingers to permit the same to grasp any tool or article desired to be lifted. Any article to be grasped would then be positioned between the thumb and fingers and the thumb and fingers allowed to come together automatically due to the spring action, in which position the article would be grasped and securely held. When an article is grasped between the thumb and fingers, the operator can pull backwardly on the control cord 35 that passes outwardly over the upper or back part of the hand, which action tends to mechanically draw the control bars 26 and 27 back to the inoperative position shown in Fig. 2, and hence to increase the locking tension of the thumb and fingers in contact with any article which might be held in the grasp of the thumb and fingers. When an article is positioned between the thumb and fingers, it is impossible to withdraw it therefrom, or rather, an article grasped by the thumb will not become dislodged therefrom except by the application of a reasonably strong dislodging pressure. Hence the curved plates 20 and 21 which control the opening and closing of the thumb and fingers cannot be operated from the thumb or finger end of the mechanism, but can only be operated by and through the control bars 26 and 27. The cam action between the control bars 26 and 27 and curved plates 20 and 21, automatically controls the separation or coming together of the thumb and fingers.

In the modified form of finger construction shown in Figs. 5, 6 and 7, I have illustrated a hand by the numeral 60. The finger consists of the first, second and third joints, 61, 62 and 63 respectively, each of which are suitably pivoted together and also pivoted to the hand at 64. The pivoted and connected joints 61, 62 and 63 form an articulated member which is adapted to bend in much the same fashion that the finger of a human will bend. Each of the joints have a substantially cylindrical contour. A finger operating wire 65 extends outwardly from the finger actuating and controlling apparatus that is concealed within the palm of the hand, and is pivoted at 66 to a lever 67 which is pivoted at 68 in the first joint 61 of the finger. The lever 67 is pivotally connected at 69 to a bar 70 which extends to and is pivotally connected at 71 to a lever 72 pivotally connected in the second joint 62 of the finger. The lever 72 is pivotally connected at 73 by a bar 74 which is pivotally connected at 75 to the third joint 63 of the finger. The mechanism for operating the modified form of finger shown in Figs. 5, 6, and 7 operates in the same manner as the mechanism for moving the fingers shown in the first four figures of the drawing. By pushing forward on the control wire 65 when the finger is in the position shown in Fig. 6, all of the joints in the finger will be straightened and caused to assume the position shown in Fig. 5. The mechanism for operating the finger joints is actuated in unison and hence any movement whatsoever of the main control wire 65 will cause a corresponding and proportionate movement of the various levers and bars that are connected to the respective finger joints. The finger is maintained in the operative position shown in Fig. 5 so long as the control wire 65 is pushed out, but the said finger will return to the inoperative position just as soon as the pressure for moving the finger is released.

Having thus described this invention, what I now claim and desire to secure by Letters Patent is:

1. An artificial hand comprised of a supporting member; a curved ended bar secured in said supporting member; a curved element pivoted in eccentric relation to said bar; means pivotally connected to said element to hold said curved element in eccentrically movable relation to said curved ended bar; a control means connected to said last mentioned means to move the curved element eccentrically relative to the curved ended bar; and a plurality of articulated fingers, mounted on the hand and operatively connected to the movable curved element, to be flexed or straightened as the curved element is moved by the control means.

2. An artificial hand comprising a supporting member; a curved ended bar secured in said supporting member; an auxiliary curved element pivotally connected to said first mentioned curved ended bar in eccentric relation thereto; a cam arm pivotally mounted on said auxiliary element engaging the eccentrically curved portions of the bar and of the auxiliary element to move said element relative to the bar; means to move the cam arm; and a plurality of articulated fingers mounted on the hand and operatively connected to the auxiliary element, to be flexed or straightened as the auxiliary element is moved by the cam arm.

3. An artificial hand comprised of a supporting member; a curved bar secured in said supporting member; a curved element pivoted in eccentric relation to said bar; means pivotally connected to said element to hold said curved element in eccentrically movable relation to said curved ended bar; a spring to resist movement of the curved element eccentrically relative to said curved ended bar in one direction; a control means connected to said last mentioned means to move the curved element against the spring tension eccentrically relative to the curved ended bar; and a plurality of articulated fingers, mounted on the hand and operatively connected to the movable curved element, to be flexed or straightened as the curved element is moved by the control means.

4. An artificial hand comprising a supporting member; a curved ended bar secured in said supporting member; an auxiliary curved element pivotally connected to said first mentioned curved ended bar in eccentric relation thereto; a cam arm pivotally mounted on said auxiliary element engaging the eccentrically curved portions of the bar and of the auxiliary element to move said element relative to the bar; a spring interposed between the cam arm and bar to resist movement of the curved element eccentrically relative to the curved ended bar in one direction; means to move the cam arm so as to actuate the auxiliary element against the tension of the spring; and a plurality of articulated fingers mounted on the hand and operatively connected to the auxiliary element to be flexed or straightened as the auxiliary element is moved by the cam arm.

5. An artificial hand comprised of a supporting member; a bar secured to said member having a curved portion thereon; a movable element pivoted to said bar having a curved portion thereon, each of said curved portions being mounted eccentrically relative to each other and in partial registry; a cam arm pivotally mounted at one end on said movable element and having its other end confining the curved portions of the bar and of the movable element therebetween, to move the movable element eccentrically relative to the bar; means to control movement of the cam arm; and a plurality of articulated fingers, mounted on the hand and operatively connected to the movable curved element, to be flexed or straightened as the curved element is moved by the control means.

6. An artificial hand comprised of a supporting member; a bar secured to said member having a curved portion thereon; a movable element pivoted to said bar having a curved portion thereon, said curved portions being eccentric relative to each other and in partial registry; a cam arm pivotally mounted at one end on said movable element and having its other end confining the curved portions of the bar and of the movable element therebetween, to move the movable element eccentrically relative to the bar; a spring interposed between the cam arm and bar to resist the eccentric movement of the curved element in one direction; means to control movement of the cam arm against the tension of said spring; and a plurality of articulated fingers, mounted on the hand and operatively connected to the movable curved element, to be flexed or straightened as the curved element is moved by the control means.

7. An artificial hand comprising a supporting member; a curved ended bar secured in said supporting member; an auxiliary curved element pivotally connected to said first mentioned curved ended bar in eccentric relation thereto; a cam arm pivotally mounted on said auxiliary element, engaging the eccentrically curved portions of the bar and of the auxiliary element to move said element relative to the bar; fingers pivotally mounted on the hand; means in each of the fingers to bend and straighten them connected to the auxiliary element; and means to move the cam arm so as to move the movable curved element to bend and straighten the fingers.

8. An artificial hand comprised of a supporting member; a bar secured to said member having a curved end thereon; a movable element pivoted to said bar having a curved end thereon, each of said curved ends being mounted eccentrically relative to each other and in partial registry; a cam arm pivotally mounted at one end on said movable element and having its other end confining the curved ends of the bar and movable element therebetween, to move the movable element eccentrically relative to the bar; fingers pivotally mounted on the hand; means in each of the fingers to bend and straighten them connected to the auxiliary element; and means to move the cam arm so as to move the movable curved ended element to bend and straighten the fingers.

9. An artificial hand comprising a supporting member; a curved bar secured in said supporting member; an auxiliary curved element pivotally connected to said first mentioned curved bar in eccentric relation thereto; a cam arm pivotally mounted on said auxiliary element engaging the eccentrically curved portions of the bar and of the auxiliary element to move said element relative to the bar; a plurality of articulated fingers mounted on the hand; control rods in each finger to articulate each finger into bent and straight positions; a cross head connected to the movable curved ended element having the finger control rods flexibly connected thereto; and means to move the cam arm to move the movable curved element and cross head so as to bend and straighten the fingers.

10. An artificial hand comprised of a supporting member; a bar secured to said member having a curved portion thereon; a movable element pivoted to said bar having a curved portion thereon, each of said curved portions being mounted eccentrically relative to each other and in partial registry; a cam arm pivotally mounted at one end on said movable element and having its other end confining the curved portions of the bar and movable element therebetween, to move the movable element eccentrically relative to the bar; a plurality of articulated fingers mounted on the hand; control rods in each finger to articulate each finger into bent and straight positions; a cross head connected to the movable curved element having the finger control rods flexibly connected thereto; and means to move the cam arms so as to move the movable curved element and cross head to bend and straighten the fingers.

11. An artificial hand comprised of a supporting member; a bar secured to said member having a curved portion thereon; a movable element pivoted to said bar having a curved end thereon, each of said curved ends being mounted eccentrically relative to each other and in partial registry; a cam arm pivotally mounted at one end on said movable element and having its other end confining the curved portions of the bar and movable element therebetween, to move the movable element eccentrically relative to the bar; a plurality of articulated fingers mounted on the hand; control rods in each finger to articulate each finger into bent and straight positions; a cross head connected to the movable curved element having the finger control rods flexibly connected thereto; a thumb member pivotally mounted on the hand and pivotally connected to the aforesaid cross head; and means to move the cam arm to move the movable curved element and cross head to open and close the fingers and thumb relative to each other.

12. An artificial hand comprising a supporting member; a curved bar secured in said supporting member; an auxiliary curved element pivotally connected to said first mentioned curved bar in eccentric relation thereto; a cam arm pivotally mounted on said auxiliary element engaging the eccentrically curved portions of the bar and of the auxiliary element to move said element relative to the bar; a cross head secured to and movable with the auxiliary element; a thumb member pivotally mounted on the hand and pivotally connected to the cross head; a plurality of articulated fingers mounted on the hand; rods to articulate each finger into bent and straight positions mounted therein and flexibly connected to the cross head; and means to move the cam arm to move the movable curved element and cross head to open and close the fingers and thumb relative to each other.

13. An artificial hand comprising a supporting member; a curved bar secured in said supporting member; an auxiliary curved element pivotally connected to said first mentioned curved bar in eccentric relation thereto; a cam arm pivotally mounted on said auxiliary element engaging the eccentrically curved portions of the bar and of the auxiliary element to move said element relative to the bar; a spring interposed between the cam arm and bar to resist the eccentric movement of the curved element in one direction; fingers pivotally mounted on the hand; means in each of the fingers to bend and straighten them connected to the auxiliary element; and means to move the cam arm to move the movable curved element against the tension of the spring to bend the fingers.

14. An artificial hand comprised of a supporting member; a bar secured to said member having a curved portion thereon; a movable element pivoted to said bar having a curved portion thereon, each of said curved portions being mounted eccentrically relative to each other and in partial registry; a cam arm pivotally mounted at one end on said movable element and having its other end confining the curved portions of the bar and of the movable element therebetween, to move the movable element eccentrically relative to the bar; a spring interposed between the cam arm and bar to resist the eccentric movement of the curved element in one direction; fingers pivotally mounted on the hand; means in each of the fingers to bend and straighten them connected to the auxiliary element; and means to move the cam arm to move the movable curved ended element against the tension of the spring to bend the fingers.

15. An artificial hand comprising a supporting member; a curved ended bar secured in said supporting member; an auxiliary curved ended element pivotally connected to said first mentioned curved ended bar in eccentric relation thereto; a cam arm pivotally mounted on said auxiliary element engaging the eccentrically curved portions of the bar and of the auxiliary element to move said element relative to the bar; a spring interposed between the cam arm and bar to resist the eccentric movement of the curved element in one direction; a plurality of articulated fingers mounted on the hand; control rods in each finger to articulate each finger into bent and straight positions; a cross head connected to the movable curved ended element having the finger control rods flexibly connected thereto; and means to move the cam arm to move the movable curved ended element and cross head against the tension of the spring to bend the fingers.

16. An artificial hand comprised of a supporting member; a bar secured to said member having a curved portion thereon; a movable element pivoted to said bar having a curved portion thereon, each of said curved portions being mounted eccentrically relative to each other and in partial registry; a cam arm pivotally mounted at one end on said movable element and having its other end confining the curved portions of the bar and movable element therebetween, to move the movable element eccentrically relative to the bar; a spring interposed between the cam arm and bar to resist eccentric movement of the curved element in one direction; a plurality of articulated fingers mounted on the hand; control rods in each finger to articulate each finger into bent and straight positions; a cross head connected to the movable curved ended element having the finger control rods flexibly connected thereto; and means to move the cam arm to move the movable curved ended element and cross head against the tension of the spring to bend the fingers.

In testimony whereof, I have hereunto set my hand at San Francisco, California, this 12th day of March, 1927.

WILLIAM A. McELROY.